S. E. Blake,
Ice Shaver.

Nº 46,331. Patented Feb. 14, 1865.

Witnesses:

Inventor:

UNITED STATES PATENT OFFICE.

S. E. BLAKE, OF WORCESTER, MASSACHUSETTS.

IMPROVED DEVICE FOR CUTTING AND SHAVING ICE.

Specification forming part of Letters Patent No. 46,331, dated February 14, 1865.

*To all whom it may concern:*

Be it known that I, S. E. BLAKE, of Worcester, in the county of Worcester and State of Massachusetts, have invented a new and Improved Implement or Device for Cutting or Shaving Ice; and I do hereby declare that the following is a full, clear, and exact description thereof, which will enable others skilled in the art to make and use the same, reference being had to the accompanying drawings, making a part of this specification, in which—

Figure 1:
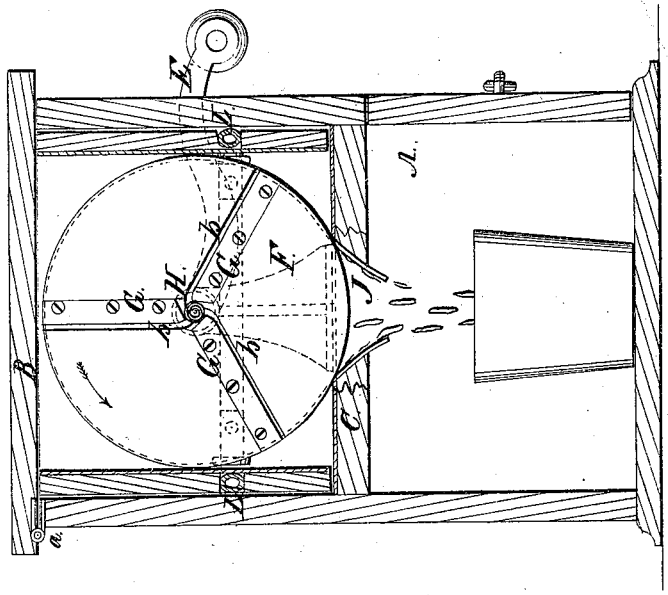
Figure 2:
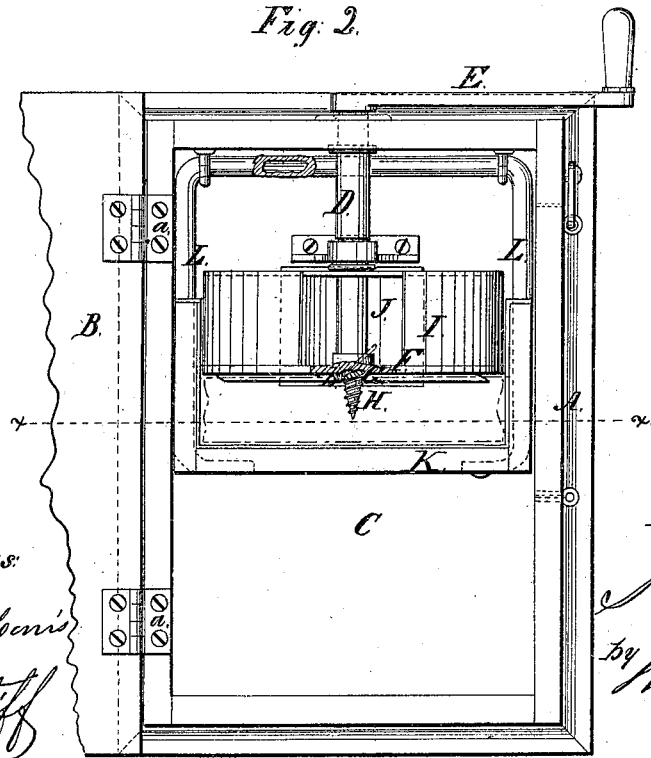

Figure 1 is a transverse vertical section of my invention; taken in the line $x\ x$, Fig. 2, Fig. 2, a plan or top view of the same, with the lid or cover raised in order to show the interior.

Similar letters of reference indicate like parts.

This invention consists in the employment or use of a rotating cutter-disk, a discharge-spout, and a follower, all arranged within a case or box to operate in such a manner as to form a very convenient device for cutting or shaving ice in small quantities from the lump, as required for immediate use.

The invention is designed for the use of bars and families, to save labor and avoid the inconvenience now attending the crushing of ice when required in small quantities.

A represents a rectangular case or box provided with a lid or cover, B, which may be attached to it by hinges $a$.

C is a horizontal partition, placed in the case or box A, and D is a shaft which passes horizontally into one end of the case or box, said shaft having a crank, E, on its outer end and a circular disk, F, on its inner end, the latter having radial slots $b$—three, more or less—made in it to form throats for cutters G, which are attached to the outer side of the disk, the cutting edges of the cutters being parallel with the throats at one edge of the same, and said throats being oblique in their transverse section. The disk F has a screw, II, at the center of its outer side, and directly behind the disk there is a cylindrical box, I, having a discharge-spout, J, at its lower end, which passes through the partition C, and communicates with the lower compartment of the case or box, as shown in Fig. 1.

K is a follower, which is placed in the upper compartment of the case or box at the outer side of the cutter-disk F, and has india-rubber or other springs L connected to it and arranged in such a manner as to have a tendency to draw the follower toward the disk F.

The operation is as follows: The ice to be cut or shaved is placed in the upper compartment between the follower K and the cutter-disk F, the springs L keeping the ice pressed against the cutter-disk. The shaft D is then turned through the medium of the crank E, and the cutters G cut or shave the ice, the screw H serving as a feeder and also to keep the lump of ice in position. The shaved ice passes through the throats $b$ into the box I, and is discharged through the spout J into the tumbler or other receptacle prepared to receive it, and which is placed in the lower compartment of the case or box through a door, M, made in the side of the same.

The case or box A may be double-walled, the space between the two walls being filled with any suitable non-conducting material, so as to form a refrigerator and prevent the melting of the ice. Thus, by this very simple arrangement a convenient and desirable ice-cutting or ice-shaving implement is obtained where ice is required in small quantities for a tumbler or table glass.

Having thus described my invention, I claim as new and desire to secure by Letters Patent—

The rotary cutter-disk F, in combination with the follower K, operated by the elastic spring L, by which the ice is held up to the cutter, the whole inclosed in a box or case, substantially as described and represented.

S. E. BLAKE.

Witnesses:
    A. DUDMOND,
    W. W. RICE.